United States Patent [19]

Marsden

[11] 4,297,336
[45] Oct. 27, 1981

[54] PREPARATION OF SOLUTIONS OF BASIC ALUMINIUM NITRATE

[75] Inventor: Robert S. Marsden, Kelsall, England

[73] Assignee: Imperial Chemical Industries Limited, London, England

[21] Appl. No.: 160,841

[22] Filed: Jun. 19, 1980

[30] Foreign Application Priority Data

Jun. 26, 1979 [GB] United Kingdom ............... 22209/79

[51] Int. Cl.³ ............................................. C01F 7/66
[52] U.S. Cl. ................................... 423/395; 423/626; 501/153
[58] Field of Search ....................... 423/395, 626, 631; 264/DIG. 19; 106/65, 73.4

[56] References Cited

U.S. PATENT DOCUMENTS

| | | | |
|---|---|---|---|
| 2,907,634 | 10/1959 | Ziese et al. | 423/626 |
| 3,268,295 | 8/1966 | Armbrust et al. | 423/626 |
| 3,411,877 | 11/1968 | Michel et al. | 423/626 |
| 3,655,329 | 4/1972 | Shih et al. | 423/395 |
| 3,950,478 | 4/1976 | Kenworthy | 264/DIG. 19 |
| 3,957,947 | 5/1976 | Yamada et al. | 423/395 X |
| 3,996,145 | 12/1976 | Hepburn | 106/65 X |

FOREIGN PATENT DOCUMENTS

| | | | |
|---|---|---|---|
| 681368 | 3/1964 | Canada | 264/DIG. 19 |
| 825414 | 12/1959 | United Kingdom. | |
| 1262123 | 2/1972 | United Kingdom. | |
| 1381034 | 1/1975 | United Kingdom. | |
| 1568831 | 6/1980 | United Kingdom. | |

*Primary Examiner*—G. O. Peters
*Attorney, Agent, or Firm*—Cushman, Darby & Cushman

[57] ABSTRACT

A process for the preparation of stable, liquid aqueous solutions of basic aluminium nitrate (aluminium oxynitrate) suitable for spinning into fibres, if desired after incorporation of a polymeric spinning aid, which process comprises reacting an aluminium oxide with nitric acid at below 25° C. to form aluminium hydroxide, optionally washing the precipitate to remove undesirable ions, e.g. sodium ions, and digesting the precipitate in nitric acid or aluminium nitrate. Preferably the solution contains aluminium ions and nitrate ions in the molar ratio 1.6:1 to 2:1. Silica may be incorporated in the solution by reacting it with the nitric acid, together with the aluminium oxide, in the first step of the process.

21 Claims, No Drawings

PREPARATION OF SOLUTIONS OF BASIC ALUMINIUM NITRATE

This invention relates to a process for the preparation of viscosity-stable solutions of basic aluminium nitrate which may contain a phase-change inhibitor and which may be spun into fibres, to the products of the process and to the preparation of polycrystalline alumina fibres from those products.

It is known that aqueous solutions of basic aluminium nitrate (aluminium oxynitrate), preferably containing a polymeric spinning aid such as polyethylene oxide, can be spun into fibres which can be calcined at temperatures of the order of 1000° C. to form polycrystalline alumina fibres. Refractory alumina fibres may be produced in this way. It is further known that polycrystalline alumina fibres desirably contain a small amount of a phase-change inhibitor such as silica in finely-dispersed form to inhibit alpha-alumina formation. For this reason it is usual to incorporate a phase-change inhibitor, notably silica or a precursor thereof, in the spinning solution.

It is also known that in order that the solution be spinnable into acceptable fibres, it is desirable that the molar ratio of aluminium ions to nitrate ions in the solution should be as high as possible, e.g. 1:1 to 2:1 and preferably greater than 1.6:1.

Aqueous solutions of basic aluminium nitrate (aluminium oxynitrate) may be produced by dissolving a compound of the metal, for example aluminium hydroxide or alumina in nitric acid or aqueous aluminium nitrate solutions. However, it has not been possible hitherto to produce by this method satisfactory stable spinning solutions having an acceptable aluminium: nitrate molar ratio, especially solutions containing a phase-change inhibitor such as silica. In particular it has not been possible hitherto to produce by the known method acceptable concentrated spinnable solutions e.g. solutions containing more than 25% aluminium (calculated as alumina) having a high molar ratio of aluminium: nitrate ions, for example 1.6:1 or greater, since at such high molar ratios of aluminium: nitrate ions the products tend to be viscous solutions or solids or if liquid tend to age rapidly and become viscous or solid. Such solutions/solids are useless in practice for spinning into fibres.

The present invention resides in the provision of aqueous basic aluminium nitrate solutions, if desired containing a phase-change inhibitor (and in particular silica), which are liquid and spinnable, if desirable after incorporation of a polymeric spinning aid, by a modification of the technique of dissolving aluminium compounds in nitric acid or aluminium nitrate solutions.

According to the present invention there is provided a process for the preparation of a stable, liquid aqueous solution of basic aluminium nitrate (aluminium oxynitrate) which is suitable for spinning into fibres, if desired after incorporation of a polymeric spinning aid, which process comprises:

(i) reacting an aluminium oxide with nitric acid solution at a temperature below 25° C., to form aluminium hydroxide, (ii) separating the resulting aluminium hydroxide precipitate, (iii) if necessary removing alkali metal ions and other undesirable ions from the precipitate, and (iv) digesting the aluminium hydroxide precipitate in nitric acid or aluminium nitrate.

As stated hereinbefore, polycrystalline alumina fibres preferably contain a small amount of silica, for example up to about 20% by weight, as phase-change inhibitor, and according to a preferred embodiment of the invention there is provided a process as defined in the immediately preceding paragraph for the preparation of a solution containing silica wherein silica is reacted with the nitric acid together with the aluminium oxide in step (i) of the process. A stabilising amount of silica may be incorporated in the solution in this way, by which is meant an amount sufficient to prevent or at least substantially inhibit phase-changes in polycrystalline alumina fibres derived from the solution.

The aluminium oxide used in step (i) of the process may if desired be a mixed oxide, for example an aluminate, e.g. sodium aluminate. Sodium aluminate is the preferred form of aluminium oxide in view of its ready availability in essentially pure form and the ease of removing sodium ions (as the nitrate) from the aluminium hydroxide precipitate in step (iii) of the process. To ensure essentially complete removal of sodium ions, which are undesirable in fibres produced from the resulting solution, the precipitated aluminium hydroxide preferably is washed several times before being digested in nitric acid or aluminium nitrate.

Step (i) of the process is carried out at a temperature, preferably below 25° C. We have found that as the temperature in step (i) is increased significantly above 25° C., then the reactivity of the aluminium hydroxide precipitate produced is reduced and digestion of the precipitate in step (iv) becomes increasingly difficult. Moreover, the solutions produced in step (iv) of the process increasingly do not exhibit acceptable stability (and in particular are subject to ageing, i.e. to adverse changes in viscosity over a period of time) and increasingly are unsatisfactory for spinning into fibres. On the other hand if the temperature is maintained at 25° C. and preferably below 25° C., solutions derived from the aluminium hydroxide precipitate in step (iv) exhibit good viscosity stability and are not subject to significant ageing. Preferably, the temperature is maintained at below 20° C., throughout step (i) of the process.

The amounts used of the components in steps (i) and (iv) of the process will be self-evident from their intended purposes. Thus in step (i) there is used sufficient nitric acid to convert all the aluminium oxide in the starting material to the desired aluminium hydroxide and to form sodium nitrate or the water-soluble nitrate of other undesirable metals present in the starting material. A slight excess of nitric acid may be used, but a large excess of acid serves no useful purpose and may in fact be harmful in dissolving a portion of the precipitated aluminium hydroxide. We prefer to ensure that the pH of the reaction mixture is maintained throughout step (i) at about 6.5, say between 6 and 7, though this is not too critical. However, if step (i) is carried out at a pH greater than 6.5 the reactivity of the precipitated aluminium hydroxide is impaired and digestion thereof becomes difficult whilst if step (i) is carried out at a pH of less than 6.5 the precipitate tends to become gelatinous and difficult to wash and handle effectively.

The amount of nitric acid or aluminium nitrate used in step (iv) of the process to digest the precipitate should preferably be just sufficient to provide the required molar ratio of aluminium ions: nitrate ions in the resulting solution. Thus for example, if a spinning solution is desired wherein the molar ratio of aluminium: nitrate ions is about 2:1 and crystalline aluminium nitrate wherein the ratio is 1:1 is used to digest the precipitate, then there will be used approximately one mole of the nitrate per five moles of aluminium hydroxide to be digested.

The temperature at which the aluminium hydroxide is digested in step (iv) is preferably an elevated temperature up to the boiling point of the mixture. We prefer to employ reflux conditions.

In general, we prefer to employ strong nitric acid in step (i) of the process, though the strength of the acid used is not critical and dilute solutions, e.g. 1N, may be used if desired. Providing the aluminium: nitrate ratio in the solution from step (iv) is acceptable e.g. from 1.5:1 to 2:1, the actual concentration of basic aluminium nitrate therein is not critical since its concentration, and hence the viscosity of the solution, can be increased by removing water from the solution, for example by evaporation. However in order to minimize the amount of water required to be removed from the solution, we prefer to employ strong solutions of nitric acid or crystalline aluminium nitrate in step (iv) of the process for digesting the precipitate.

In the case where silica is incorporated in the spinning solution by including it in step (i) of the process, the amount of silica is chosen on the basis of the total aluminium ion content (expressed as alumina) of the solution, eg the sum of the aluminium in hydroxide precipitated in step (i) and the aluminium added as nitrate used to digest the precipitate. Usually, the amount of silica will be from 2% to 20%, preferably from 2% to 10%, by weight based on the aluminium ion content of the spinning solution (expressed as alumina).

The aluminium oxynitrate spinning solutions produced by the process of the invention whether or not they contain silica are novel solutions which are also provided according to the invention, e.g. liquid, viscosity-stable, aqueous spinning solutions comprising basic aluminium nitrate wherein the molar ratio of aluminium ions: nitrate ions is from 1.6:1 to 2:1, preferably containing finely-dispersed silica in an amount of from 2% to 20% by weight based on aluminium (expressed as alumina).

The solutions produced by the process of the invention, preferably after addition of a polymeric spinning aid, may be converted into fibres by any of the known techniques for making polycrystalline alumina fibres, for example by blow-spinning or centrifugal spinning. We prefer to form fibres from the solutions by a blow-spinning operation in which the solution is spun through orifices into two converging (e.g. 30°), high-velocity streams of air of high relative humidity, for example preferably 80% or above, which are then dried by exposure to hot air of low relative humidity. Such a process is described, for example, in our United Kingdom Patent Specification No. 1 322 723. A suitable process for forming fibres by a centrifugal spinning technique is described in German Offenlegungschrift No. 2735236.

The relevant disclosures of these references are incorporated herein by reference. As is explained in the references, the viscosity of the spinning solution can be adjusted if desired to increase their spinnability, by the addition of organic polymeric spinning aids, for example polyethylene oxide and polyvinylalcohol.

The invention is illustrated but in no way limited by the following Examples:

EXAMPLE 1

3 l of sodium aluminate solution (15.4% Al:12.3% NaO$_2$) was mixed slowly and continuously at a temperature of 15° to 17° C. with 35% nitric acid solution at a rate such that the pH of the reaction mixture was maintained throughout at about 6.7. The overall time taken for the mixing and reaction was 70 minutes. The resulting white precipitate of aluminium hydroxide was separated by filtration under vacuum and washed over a period of 1 hour with 32 l of tap water. The washed precipitate was then dried under vacuum and then slurried in water and the slurry was filtered to increase its solids content. Analysis of the concentrated slurry or precipitate so produced indicated that it comprised 17.9% alumina (Al$_2$O$_3$) and 3.3% nitrate ion (NO$_3^-$).

The concentrated slurry or precipitate (378 g) was placed in a vessel and agitated, and to it was added aluminium nitrate crystals (82.4 g) in order to yield a solution wherein the mole ratio of Al:NO$_3$ was 1.8:1. The mixture was heated to reflux over a period of 12 minutes after which reflux conditions were maintained for 1 hour to digest the precipitate. The solution was then allowed to cool to room temperature.

In a vigorously—agitated portion of this solution were dissolved polyethylene oxide (WSR 205), polyvinyl pyrrolidone (K15) and thiourea (0.1 g) such that the resulting solution contained 4½% by weight of each polymer based on the alumina content of the solution. The resulting solution was concentrated by evaporation of water until it contained 28–29% w/w alumina (Al$_2$O$_3$), at which point its viscosity was 4.03 poise.

The solution was allowed to stand, and it was observed that over the following week its viscosity increased slightly to a final value of 7.17 poise. The solution was spun satisfactorily into fibres as described hereinafter in Example 6.

EXAMPLE 2

7 l of sodium aluminate solution (8.7% Al$_2$O$_3$: 7% NaO$_2$) were mixed slowly and continuously at 17° C. with 17.3% nitric acid solution at a rate such that the pH of the mixture was maintained throughout in the range of from 6.3 to 6.7. The overall mixing time was 85 minutes and during the mixing, for each liter of aluminate added, an aliquot of aqueous sodium silicate solution was slowly added. Each aliquot of sodium silicate solution was 1200 l of a solution comprising 24 g of sodium silicate (C125), 33% SiO$_2$, in water.

The resulting precipitate was separated by filtration under vacuum, washed with water (28 l) over a period of 50 minutes, dried under vacuum, slurried with water and refiltered as described in Example 1. Analysis of the resulting gel precipitate indicated 17.7% Al$_2$O$_3$ and 2.8% NO$_3^-$ ion. Assuming no loss of alumina or silica during the precipitation and washing steps, the precipitate contained 9.2% by weight of silica based on Al$_2$O$_3$ (this was not confirmed by analysis).

The gel precipitate (572.6 g) was agitated in a vessel and to it was added crystalline aluminium nitrate, Al(NO$_3$)$_3$.9H$_2$O (117.6 g). The agitated mixture was heated to reflux temperature over a period of 22 minutes and reflux conditions were maintained for a further hour to digest the precipitate, before the resulting solution was cooled to room temperature. Analysis of the solution indicated 16.6% Al$_2$O$_3$: 0.8% NO$_3^-$ ion which corresponds to an aluminium:nitrate mole ratio of 1.83:1. Analysis for silica by atomic adsorption spectroscopy indicated a silica content of approximately 1.5% by weight of the solution.

To the rapidly stirred solution cooled by an ice bath were added polyethylene oxide (WSR 205), polyvinylpyrrolidone (K15) and thiourea (0.1 g) in amounts such that the solution contained 4½% by weight of each polymer based on the alumina content of the solution. The additives dissolved in the solution over a period of about 30 minutes. Rapid stirring was effected using a Silverson Heavy Duty Laboratory mixer).

The resulting solution was concentrated by evaporation of water to 28–29% $Al_2O_3$ content, at which point its viscosity was 5.1 poise. After standing for two weeks, the viscosity of the solution had risen to 5.6 poise. Fibres were spun from the solution as described in Example 6.

EXAMPLE 3

This Example demonstrates the adverse effect on precipitate reactivity and solution viscosity stability of carrying out the precipitation reaction at a temperature above 25° C.

A precipitate of aluminium hydroxide, and silica was prepared from sodium aluminate solution (15.4% $Al_2O_3$;12.3% $NaO_2$), 35% nitric acid and sodium silicate solution by the procedure described in Example 2. The calculated silica content of the precipitate was 5% by weight based on the alumina. The pH of the mixture was maintained throughout the precipitation at 6.5 and the temperature was permitted to range between 30° C. and 35° C.

The precipitate was separated by filtration, washed, dried, slurried and refiltered as described in Example 1. Analysis of the final precipitate indicated 23.2% $Al_2O_3$ and 4.3% $NO_3^-$ ion.

The precipitate (550 g) was digested with crystalline aluminium nitrate (134.5 g) as described in Example 2; the precipitate was difficult to digest and reflux conditions had to be maintained for 3 hours before a clear solution was obtained.

Into the cooled, stirred clear solution was dissolved polyethylene oxide (WSR 205) to produce a spinning solution containing 5.6% by weight polymer based on the alumina content of the solution. The concentration of the alumina was increased to 29% by weight of the solution by evaporation of water. The viscosity of the freshly-prepared spinning solution was 47 poise. After the solution had stood for 24 hours, its viscosity had risen to 130 poise.

Fibres were spun from the freshly-prepared solution as described in Example 6.

EXAMPLE 4

Sodium aluminate solution (20.1% $Al_2O_3$: 4.1% $NaO_2$) was reacted with 35% nitric acid by the procedure described in Example 2 and the precipitate was separated, washed, dried, slurried with water and refiltered as described. 700 g of wet precipitate were obtained.

The precipitate was mixed with crystalline aluminium nitrate (128.5 g) and the temperature of the mixture was raised to 100° C. over a period of 15 minutes. The mixture was maintained under reflux for a further 10 minutes after which time the reflux condenser was inverted to act in the distillation mode and about 300 g of water were removed. The product solution from this combined digestion/concentration step contained 30.2% by weight of alumina and 19.71% by weight nitrate ion. The mole ratio of aluminium:nitrate ion was 1.86.

Polyethylene oxide (WSR 205), polyvinyl pyrrolidone (K15) and thiourea (0.1 g) were dissolved in the solution to provide a spinning solution containing 4.5% by weight of each polymer based on the alumina in the solution. The spinning solution had a viscosity of 8.7 poise which rose to 9.6 poise after the solution had stood for 1 week.

EXAMPLE 5

A precipitate of aluminium hydroxide and silica was prepared from sodium aluminate solution, nitric acid and sodium silicate solution as described in Example 2, and separated, washed, dried, slurried with water and filtered as also described in Example 2. Analysis of the precipitate indicated 17.4% alumina and 2.5% by weight $NO_3^-$ ion.

The precipitate (530 g) was placed in a round-bottomed flask and to it was added concentrated (70%) nitric acid (49.8 ml). The mixture was heated to reflux temperature and reflux conditions were maintined for 75 minutes, during which time the reflux condenser was inverted and about 260 g of water were removed from the solution. Analysis of the final solution indicated a 26% alumina content.

Polyethylene oxide (WSR 205), 4.5% w/w on alumina), polyvinyl pyrrolidone (K15, 4.5% w/w on alumina) and thiourea (0.1 g) were dissolved in the solution to yield a spinning solution of viscosity 8.6 poise. After a small portion of the solution had stood for 3 weeks, its viscosity had risen to 14.4 poise.

The freshly-prepared solution (8.6 poise) was spun into fibres as described in Example 6.

EXAMPLE 6

Each of the spinning solutions prepared in Example 1 to 5 was spun into fibres using the following procedure.

The spinning solution was extruded at room temperature and at a pressure of 0.3 Kg/cm$^2$ through 250 micron diameter orifices into converging high velocity streams of air of relative humidity 83 to 86%. The air streams were projected from two slits one either side of the extrusion orifices, and converging at an angle of 60° just below the point at which the spinning solution was extruded. The air streams were at a temperature of 22° to 26° C. and had a velocity of 100 m/sec. The extruded fibres were drawn down to fine diameters by the attenuating air and dried in a dry air zone at 80° C. before being collected as a mat on a ⅛ inch mesh wire gauze. Collection of the fibres on the gauze was assisted by suction from a fan located below the gauze.

Using each of the spinning solutions from Examples 1 to 5, good quality fibres of length greater than 5 cms and diameters in the range 2.5 microns to 8 microns were produced which were free from shot. The fibres produced using the spinning solution from Example 3 had diameters ranging from 3.5 microns to 7.5 microns with a mean diameter of 5.75 microns. The fibres from the solution prepared in Example 4 had diameters ranging from 3 microns to 6.5 microns with a mean diameter of 4.5 microns.

In each experiment, the mat of uncured fibres collected on the gauze was heated at 200° C. for 1 hour then at 800° C. for 2 hours to yield in each case a stable fluffy mat of fine fibres.

I claim:

1. A process for the preparation of a stable, liquid aqueous solution of basic aluminium nitrate which comprises:
   (i) reacting an aluminium oxide with nitric acid solution at a temperature of below 25° C. to form aluminium hydroxide,
   (ii) separating the resulting aluminium hydroxide precipitate,
   (iii) if necessary removing alkali metal ions and other undesirable ions from the precipitate, and
   (iv) digesting the aluminium hydroxide precipitate in nitric acid or aluminium nitrate.

2. A process as claimed in claim 1 for the preparation of a solution containing silica which comprises reacting silica with the nitric acid solution together with the aluminium oxide in step (i) of the process.

3. A process as claimed in claim 1 or 2 wherein the pH of the reaction mixture is maintained throughout step (i) at approximately 6.5.

4. A process as claimed in claim 1, 2 or 3 wherein the temperature in step (i) is below 20° C.

5. A process as claimed in claim 1 or 2 wherein the precipitated aluminium hydroxide is washed (step (iii)) before being digested in nitric acid or aluminium nitrate.

6. A process as claimed in claim 1 wherein the temperature at which the aluminium hydroxide precipitate is digested in step (iv) is an elevated temperature up to the boiling point of the mixture.

7. A process as claimed in claim 6 in which the aluminium hydroxide is digested under conditions of reflux.

8. A process as claimed in claim 1 wherein strong nitric acid is employed in step (i).

9. A process as claimed in claim 1 or 2 wherein strong nitric acid is employed in step (iv).

10. A process as claimed in claim 2 for preparing a solution containing silica wherein the amount of silica is from 2% to 20% by weight based on the aluminium ion content (expressed as alumina) of the solution.

11. A process as claimed in claim 10 wherein the amount of silica is from 2% to 10% by weight based on the aluminium ion content (expressed as alumina) of the solution.

12. A process as claimed in claim 1 wherein the aluminium oxide used in step (i) is a mixed oxide.

13. A process as claimed in claim 12 wherein the mixed oxide is sodium aluminate.

14. A process as claimed in claim 1 or 2 wherein the amounts of the aluminium hydroxide and nitric acid or aluminium nitrate used in step (iv) are such as to provide in the solution a molar ratio of aluminium ions: nitrate ions of from 1.6:1 to 2:1.

15. A stable, liquid aqueous solution of basic aluminium nitrate wherein the molar ratio of aluminium ions: nitrate ions is from 1.6:1 to 2:1.

16. A solution as claimed in claim 15 which contains silica.

17. A solution as claimed in claim 16 wherein the amount of silica is from 2% to 20% by weight based on the aluminium ion content (expresed as alumina) of the solution.

18. A solution as claimed in claim 17 wherein the amount of silica is from 2% to 10% by weight based on the aluminium ion content (expressed as alumina) of the solution.

19. A solution as claimed in claim 15, 16, 17 or 18 which contains a polymeric spinning aid.

20. A process for the preparation of alumina fibres which comprises spinning into fibres the solution prepared by the process as claimed in claim 1.

21. A process for the preparation of alumina fibres which comprises spinning into fibres the solution claimed in claim 15.

* * * * *